United States Patent [19]
Loqvist

[11] 3,807,012
[45] Apr. 30, 1974

[54] METHOD OF MAKING A COMPOSITE ROLLER FOR HOT AND COLD ROLLING

[75] Inventor: Kaj Ragnar Loqvist, Fagersta, Sweden

[73] Assignee: Fagersta Aktiebolag, Fagersta, Sweden

[22] Filed: Nov. 13, 1972

[21] Appl. No.: 306,049

Related U.S. Application Data
[62] Division of Ser. No. 210,440, Dec. 21, 1971.

[30] Foreign Application Priority Data
Jan. 8, 1971  Sweden.................................. 170/71

[52] U.S. Cl................ 29/148.4 D, 29/129, 29/132, 29/527.5, 164/103, 164/105
[51] Int. Cl........................ B23p 17/00, B22d 19/12
[58] Field of Search.......... 29/125, 129.5, 130, 132, 29/148.4 D, 527.5, 530, 129; 164/106, 103, 105

[56] References Cited
UNITED STATES PATENTS
1,549,218   8/1925   Raym................................. 164/106
2,342,159   2/1944   Moran........................... 29/148.4 D
3,609,849   10/1971  Krol...................................... 29/132
3,667,096   6/1972   Edsmar................................ 29/125
1,132,611   3/1915   Osler.................................. 164/103
1,153,197   9/1915   Craig.................................. 164/103
1,309,182   7/1919   Clerglet.............................. 164/103
2,026,612   1/1936   Chase............................. 164/105 X Primary Examiner—Richard J. Herbst
Assistant Examiner—D. C. Reiley, III
Attorney, Agent, or Firm—Larson, Taylor and Hinds

[57] ABSTRACT

A method for making a roller for hot and cold rolling by placing at least the radial inner portion of a hard metal ring in a mold cavity, heating the mold cavity and the hard metal ring and casting therearound, at least at the inner part of the radial sides of the inner ring, an annular hub of ferrous alloy. After casting, the hub and the hard metal ring are cooled, the hub shrinking more than the hard metal ring so as to exert compression forces thereagainst to hold the same in place.

5 Claims, 4 Drawing Figures

PATENTED APR 30 1974　　3,807,012
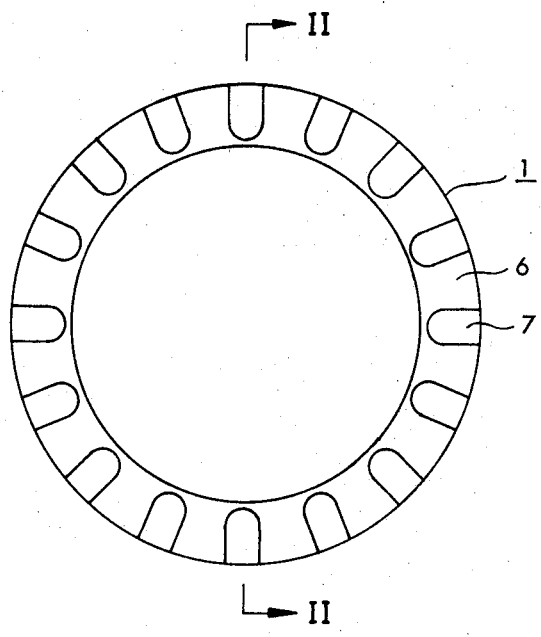
FIG. 1
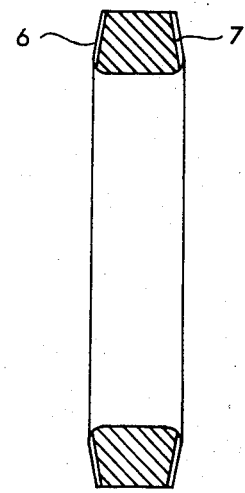
FIG. 2
FIG. 3
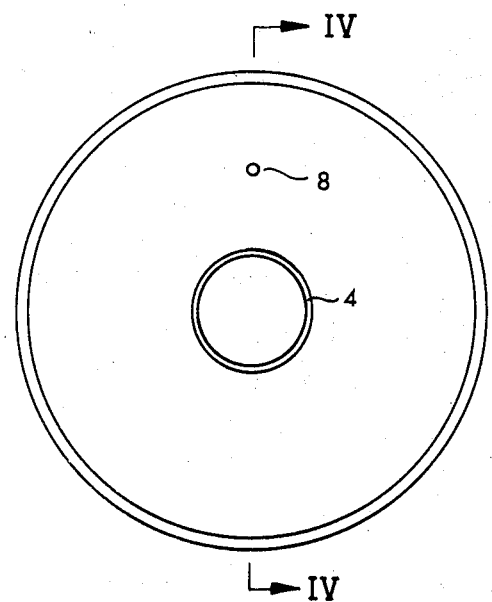
FIG. 4
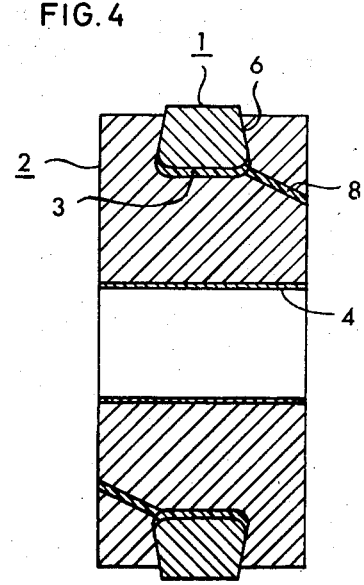

METHOD OF MAKING A COMPOSITE ROLLER FOR HOT AND COLD ROLLING

This is a division, of application Ser. No. 210,440 filed Dec. 21, 1971.

The present invention refers to a roller for hot-rolling and/or cold-rolling, in which the rolling surface is formed by a hard metal ring on a roller body or hub of a ferrous alloy, for instance steel. In manufacturing rollers having a rolling surface of hard metal it is for economically desirable to minimize the amount of hard metal required. Usually the hard metal has been connected to roller body by means of a mechanical joint. This requires close tolerances and relatively expensive manufacturing operations such as grinding. Further, assemblies of this kind are sensitive to temperature variations, and the hard metal ring has a tendency to burst.

The object of the invention is to eliminate the disadvantages of prior known assemblies of this kind. The present invention is characterized in that the roller body is cast around the hard metal ring and that the cross sectional width of the hard metal ring increases from the rolling surface towards the centre of the roller, so that a pre-stressing is obtained of the hard metal ring when located in the body or hub of ferrous alloy, for instance steel.

Since the roller body or hub is cast around the hard metal ring it is no longer necessary to grind same before the mounting operation as in prior known hard metal roller assemblies. The hard metal ring is securely fastened to the hub by means of the compressive stresses which are exerted against the side edges of the hard metal ring by the hub. The compressive stresses derive from the difference between the coefficients of expansion of the hard metal and the ferrous alloy or steel. The magnitude of the compressive stresses may be regulated by varying the inclination of the side edges of the hard metal ring in relation to the shaft of the roller. The side edges may also be wave-formed or formed with grooves or other unevennesses in order to improve the transmission of the torque between the hard metal ring and the hub. The casting may be done in a sand mould or cast iron mould or in any other known way.

An example of a method whereby a hub of a ferrous alloy such as steel can be cast around a hard metal ring is described in the following paragraph.

First a cast iron mold is treated with an emulsion of oil and graphite. Then a hard metal ring is placed in the cast iron mold and the assembly is preheated in a furnace to a temperature such as 600°C. in order to prevent blister formation in the casting and to reduce the effects of the difference in the coefficients of thermal expansion. The heating should take place in a protective atmosphere or in a vacuum in order to prevent oxidizing of the hard metal ring and the cast iron mold. Next a molten ferrous alloy material is poured into the mold. Cooling should be done slowly so that the ferrous alloy shall not be brittle. After a suitable time the hard metal ring assembly is removed from the cast iron mould and is packed into a heat isolating material. The hard metal assembly may be packed into the heat isolating material without having been removed from the cast iron mould.

The accompanying drawings depict a hard metal ring assembly. FIG. 1 is a side-view of a hard metal ring, and FIG. 2 is a cross-sectional view taken along the line II — II of FIG. 1. FIG. 3 is a side view of a roller assembly according to the invention, and FIG. 4 is a cross-sectional view taken along the line IV — IV of FIG. 3.

Reference number 1 indicates a hard metal ring intended to have case around it the roller body or hub 2 of a ferrous alloy, for instance steel. The hard metal ring 1 is provided with groves 7 on the opposite side edges thereof. It is evident from figures 2 and 4, that the side edges 6 of the hard metal ring 1 converge somewhat in a radially outward direction.

FIGS. 3 and 4 show the hard metal ring 1 with the body or hub 2 cast around it. During cooling the ferrous alloy such as steel shrinks more than the hard metal ring so that a cleft is formed under the hard metal ring 1 between it and the body 2.

After the body or hub has cooled the assembly of the ferrous alloy body and the hard metal piece are turned clean and holes 8 are bored in the body for injecting a reinforced epoxy base thermosetting resin or any other suitable support material into the cleft 3 under the hard metal ring. During the cooling following the casting step a correct temperature gradient is maintained between the hard metal ring and the ferrous alloy material. The temperature of the hard metal is maintained higher than that of the ferrous alloy material by supplying heat to the hard metal ring while the centre of the casting is cooled for instance by means of air.

Because of the axial and radial mounting of the hard metal ring 1 in the body 2, water cooling, which is normally necessary, can be eliminated or reduced. By providing suitable cooling rings or cooling flanges on the side edges of the hub the temperature of the roller may be controlled. In order to minimize heat flow from the rolling surface of the hard metal ring 1 to the roller shaft the part of the hub 2 engaging the shaft may be provided with, shell 4 of heat insulating material such as titanium oxide.

Use of a cast iron mold allows the centre of the hub to be cooled during casting so that the effect of the different coefficients of thermal expansion can be controlled.

It is imperative that a correct temperature gradient be maintained between the ferrous alloy and the hard metal parts. The temperatures of the ferrous alloy and the hard metal respectively are chosen with respect to their coefficients of thermal expansion, i.e. the ferrous alloy such as steel is kept at a lower temperature than the hard metal. This may be done by adding heat to the outside of the cast iron mould such as by means high frequency currents while the centre thereof is cooled by means of for instance air or water.

The comparative advantages of the disclosed roller assembly over the roller assemblies of the prior art are that it is less expensive to manufacture, it is not as sensitive to increased operating temperatures, and it has a longer operating life because water cooling of the rolling surface during operation may be eliminated or reduced so that the temperature gradient between the rolling material and the roller becomes less intense and thus the effects of thermal shock are minimized.

What we claim is:

1. A method of making a roller for hot and cold rolling comprising the steps of: providing a hard metal ring, the cross-section of which decreases radially outwardly, positioning this ring with at least its radial inner part located in an annular mold cavity, heating the mold and the hard metal ring, and while they are heated filling the mold with a molten ferrous alloy material such that the ferrous alloy is formed into an annular hub, the outermost part of which fits tightly against the outwardly converging sides of the inner part of the hard metal ring, and cooling the ferrous alloy and the hard metal ring slowly such that the ferrous alloy hub shrinks against the hard metal ring to exert compressive forces thereagainst without becoming brittle.

2. The method of claim 1, including the steps of heating the mold with the hard metal ring positioned therein before adding the molten ferrous alloy material.

3. The method of claim 1, wherein during cooling, an annular cleft is formed between the hard metal ring and the hub and including the steps of filling this space with a suitable supporting material.

4. The method of claim 1, wherein the hard metal ring and the mold cavity are heated to a temperature of approximately 600° C.

5. A method according to claim 1, wherein the said cooling step comprises adding heat to the hard metal ring while cooling the inner portion of the hub.

* * * * *